United States Patent
Hempton et al.

(10) Patent No.: US 11,929,974 B2
(45) Date of Patent: Mar. 12, 2024

(54) AUTOMATICALLY MANAGING EMAIL COMMUNICATIONS USING INDIRECT REPLY IDENTITY RESOLUTION

(71) Applicant: Outreach Corporation, Seattle, WA (US)

(72) Inventors: Gordon L. Hempton, Seattle, WA (US); Wesley R. Hather, Seattle, WA (US); Andrew S. Kinzer, Seattle, WA (US); Manuel A. Medina, Seattle, WA (US)

(73) Assignee: Outreach Corporation, Seattle, WA (US)

( * ) Notice: Subject to any disclaimer, the term of this patent is extended or adjusted under 35 U.S.C. 154(b) by 0 days.

(21) Appl. No.: 18/142,947

(22) Filed: May 3, 2023

(65) Prior Publication Data

US 2023/0275865 A1 Aug. 31, 2023

Related U.S. Application Data

(63) Continuation of application No. 17/524,651, filed on Nov. 11, 2021, now Pat. No. 11,677,709, which is a
(Continued)

(51) Int. Cl.
*H04L 51/42* (2022.01)
*G06F 16/23* (2019.01)
(Continued)

(52) U.S. Cl.
CPC .......... *H04L 51/42* (2022.05); *G06F 16/2365* (2019.01); *G06F 16/275* (2019.01); *H04L 51/212* (2022.05); *H04L 51/234* (2022.05)

(58) Field of Classification Search
CPC ..... H04L 51/42; H04L 51/212; H04L 51/234; H04L 51/216; H04L 51/214; H04L 51/18; G06F 16/2365; G06F 16/275
See application file for complete search history.

(56) References Cited

U.S. PATENT DOCUMENTS

| 7,689,563 B1 | 3/2010 | Jacobson |
| 8,943,024 B1 | 1/2015 | Gardner et al. |

(Continued)

FOREIGN PATENT DOCUMENTS

| CN | 101729448 A | 6/2010 |
| JP | H10190728 A | 7/1998 |

(Continued)

OTHER PUBLICATIONS

European Patent Office, Extended European Search Report and Opinion, EP Patent Application No. 19784550.6, dated Dec. 6, 2021, 10 pages.
(Continued)

*Primary Examiner* — Kim T Nguyen
(74) *Attorney, Agent, or Firm* — Fenwick & West LLP

(57) ABSTRACT

Methods and systems are enclosed herein for automatically managing email communication between a group of users and a group of target prospects. A sequence of outbound emails is automatically sent on behalf of a user to a prospect. Based upon the prospect's inbound replies (or lack thereof) the system will perform preconfigured actions, such as stopping automated communications and deferring to the user for manual action.

20 Claims, 11 Drawing Sheets

Related U.S. Application Data continuation of application No. 17/157,809, filed on Jan. 25, 2021, now Pat. No. 11,201,846, which is a continuation of application No. 16/677,552, filed on Nov. 7, 2019, now Pat. No. 10,938,766, which is a continuation of application No. 15/950,370, filed on Apr. 11, 2018, now Pat. No. 10,505,882.

(51) Int. Cl.
*G06F 16/27* (2019.01)
*H04L 51/212* (2022.01)
*H04L 51/234* (2022.01)

(56) References Cited

U.S. PATENT DOCUMENTS

| | | | |
|---|---|---|---|
| 9,559,997 | B1 | 1/2017 | Everton |
| 10,505,882 | B2 | 12/2019 | Hempton et al. |
| 10,540,610 | B1* | 1/2020 | Yang .................. H04L 51/42 |
| 10,938,766 | B2 | 3/2021 | Hempton et al. |
| 2002/0112008 | A1 | 8/2002 | Christenson et al. |
| 2002/0161788 | A1 | 10/2002 | McDonald |
| 2007/0174448 | A1 | 7/2007 | Ahuja et al. |
| 2009/0319624 | A1 | 12/2009 | Buschi et al. |
| 2015/0052177 | A1 | 2/2015 | Roseman et al. |
| 2015/0074547 | A1 | 3/2015 | Banatwala et al. |
| 2015/0081819 | A1 | 3/2015 | Wideman |
| 2015/0212889 | A1 | 7/2015 | Amarendran et al. |
| 2015/0229599 | A1 | 8/2015 | Arora et al. |
| 2016/0328803 | A1 | 11/2016 | Whitley et al. |
| 2017/0272550 | A1 | 9/2017 | Rodriguez |
| 2018/0234375 | A1* | 8/2018 | Gray .................. G06Q 10/107 |
| 2018/0253659 | A1 | 9/2018 | Lee et al. |
| 2019/0306192 | A1* | 10/2019 | Xie .................. H04L 69/22 |
| 2021/0133234 | A1 | 5/2021 | Bedadala et al. |

FOREIGN PATENT DOCUMENTS

| | | |
|---|---|---|
| JP | 2000270011 A | 9/2000 |
| JP | 2002-014898 A | 1/2002 |
| JP | 2002-288548 A | 10/2002 |
| JP | 2010152538 A | 7/2010 |
| JP | 2010-218363 A | 9/2010 |

OTHER PUBLICATIONS

Intellectual Property India, Office Action, Indian Patent Application No. 202047037868, dated Nov. 24, 2021, 7 pages.
Japan Patent Office, Office Action, JP Patent Application No. 2020-554869, dated Feb. 21, 2023, 5 pages.
PCT International Search Report and Written Opinion, PCT Application No. PCT/US2019/026917, dated Jun. 26, 2019, 14 pages.
United States Office Action, U.S. Appl. No. 16/677,552, dated Aug. 21, 2020, 9 pages.
United States Office Action, U.S. Appl. No. 15/950,370, dated Jun. 28, 2019, 11 pages.
United States Office Action, U.S. Appl. No. 17/524,651, dated Jul. 20, 2022, 8 pages.
United States Office Action, U.S. Appl. No. 17/524,651, dated Oct. 18, 2022, 6 pages.
Japan Patent Office, Office Action, Japanese Patent Application No. 2023-182370, dated Nov. 14, 2023, 13 pages.
Okamoto, S et al. "Industrial Applications of AI Technologies," Journal of Japanese Society for Artificial Intelligence, vol. 15, No. 6, Nov. 1, 2000, pp. 1027-1034, Concise Explanation of Relevance Written to Accompany.

* cited by examiner

| Conditions | Classification |
|---|---|
| Subject prefixed with:<br>    "Ooto"<br>    "Auto"<br>    "Ooo" | Out of the office |
| Subject contains<br>    "automatic reply"<br>    "auto response"<br>    "out of office"<br>    "out of the office"<br>    "away from my mail"<br>    "on leave"<br>    "sick leave" | Out of the office |
| First 80 characters of body contains:<br>    "out of office"<br>    "out of the office"<br>    "away from my mail"<br>    "on leave"<br>    "sick leave"<br>    "maternity leave" | Out of the office |
| Message header contains:<br>    "Auto-submitted" with value "no"<br>    "X-autoreply"<br>    "X-autorespond"<br>    "X-mdautoresponse" | Out of the office |
| Sender email prefixed with:<br>    "Mailer-daemon"<br>    "Mailerdaemon"<br>    "postmaster" | Bounce |
| Subject prefixed with:<br>    "Undeliverable"<br>    "failed mail"<br>    "failed delivery"<br>    "mail delivery fail"<br>    "mail system error"<br>    "failure notice"<br>    "Nondeliverable"<br>    "delivery status notification (failure)" | Bounce |
| Message header "in_reply_to" or "references" contains a message_id of an Outreach message | Reply |
| Body contains Outreach tracking links from a previously delivered message | Reply |
| A previously delivered (non replied) Outreach message to the sender contains the subject of this message | Reply |

FIG. 3

| | |
|---|---|
| Monday | 9am - 6pm PST |
| Tuesday | 12pm - 2pm PST |
| Wednesday | 12pm - 2pm PST |
| Thursday | 9am - 6pm PST |
| Friday | 9am - 6pm PST |
| Saturday | |
| Sunday | |

AUTOMATICALLY MANAGING EMAIL COMMUNICATIONS USING INDIRECT REPLY IDENTITY RESOLUTION

CROSS-REFERENCE TO RELATED APPLICATIONS

This application is a continuation of U.S. application Ser. No. 17/524,651, filed Nov. 11, 2021, which is a continuation of U.S. application Ser. No. 17/157,809, filed Jan. 25, 2021, now U.S. Pat. No. 11,201,846, which is a continuation of U.S. application Ser. No. 16/677,552, filed Nov. 7, 2019, now U.S. Pat. No. 10,938,766, which is a continuation of U.S. application Ser. No. 15/950,370, filed Apr. 11, 2018, now U.S. Pat. No. 10,505,882. All of which are hereby incorporated by reference in their entirety.

FIELD

The present invention relates to email communication.

BACKGROUND

This disclosure relates to a method and system for automatically managing email communication between a group of users and a group of target prospects. Email is ubiquitous, and the application of this is relevant to a large number of fields, but-for the purposes of simplicity-specific examples in this document will be limited to the sales industry.

Managing email relationships with a large number of people (prospects) is central to the role of a sales professional. In many cases, an individual may be reaching out to hundreds of prospects simultaneously. In order to be effective, each individual thread of communication must be maintained and followed up on. Moreover, the response (or lack of response) from a prospect requires action by the sales professional. This could include, but is not limited to, updating data within a Customer Relationship Management system or setting up future follow-up activities. Traditionally, these actions are done manually and require considerable effort on the part of the sales person. In the event of a lack of response from a prospect, the future action of following up can be forgotten or missed-leading to decreased effectiveness and excess labor costs.

In the context of a sales organization involving a large number of sales personnel, coordinating communication across the entirety of the team becomes increasingly important. If a sales professional within an organization is reaching out to an individual, it is desirable to know if anyone else from that organization has reached out to the same individual in order to drive strategy in the sales process. If multiple sales personnel are reaching out the same individual simultaneously, it is important to ensure that both efforts are mutually known and coordinated.

Standard email servers and clients do not provide functionality for multiple inboxes to be synchronized simultaneously nor do they provide the ability to automate actions or consume information based on the data provided by all inboxes within an organization.

Accordingly, what is needed is a system to automate the initial correspondences, bring down emails from all email mailboxes within an organization, and to store and process the data in a manner that enables the automation and efficient display of the data.

SUMMARY OF THE INVENTION

Methods and systems are enclosed herein for automatically managing email communication between a group of users and a group of target prospects. The system provides a user interface for managing the complexity of dealing with multiple inboxes and recipients simultaneously as well as customizable automation based upon the email content, recipients, and other metadata.

In one embodiment, an automated system is put in place to enable the user to send a series (or "sequence") of automated or manual emails to specific recipients. These sequences are constructed as a number of "steps" consisting of templated email content. A template contains variables that are automatically populated from an underlying database containing additional information about intended recipients.

Underlying this is a system which maintains connections to email mailboxes on behalf of many users. These mailboxes are periodically queried for new email messages on a continual basis. In the event of a new message, the message is checked for relation to a particular sequence. The system may contain logic to stop the delivery of a sequence conditioned on certain recipient behavior, such as replying to a message.

BRIEF DESCRIPTION OF THE DRAWINGS

FIG. 3 is a table showing how an embodiment of the system classifies inbound emails in accordance with the present invention.

FIG. 9 is a chart illustrating delivery schedule blocks.

DETAILED DESCRIPTION OF ONE OR MORE EMBODIMENTS

Systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are reused to indicate correspondence between referenced elements.

Figure 1:
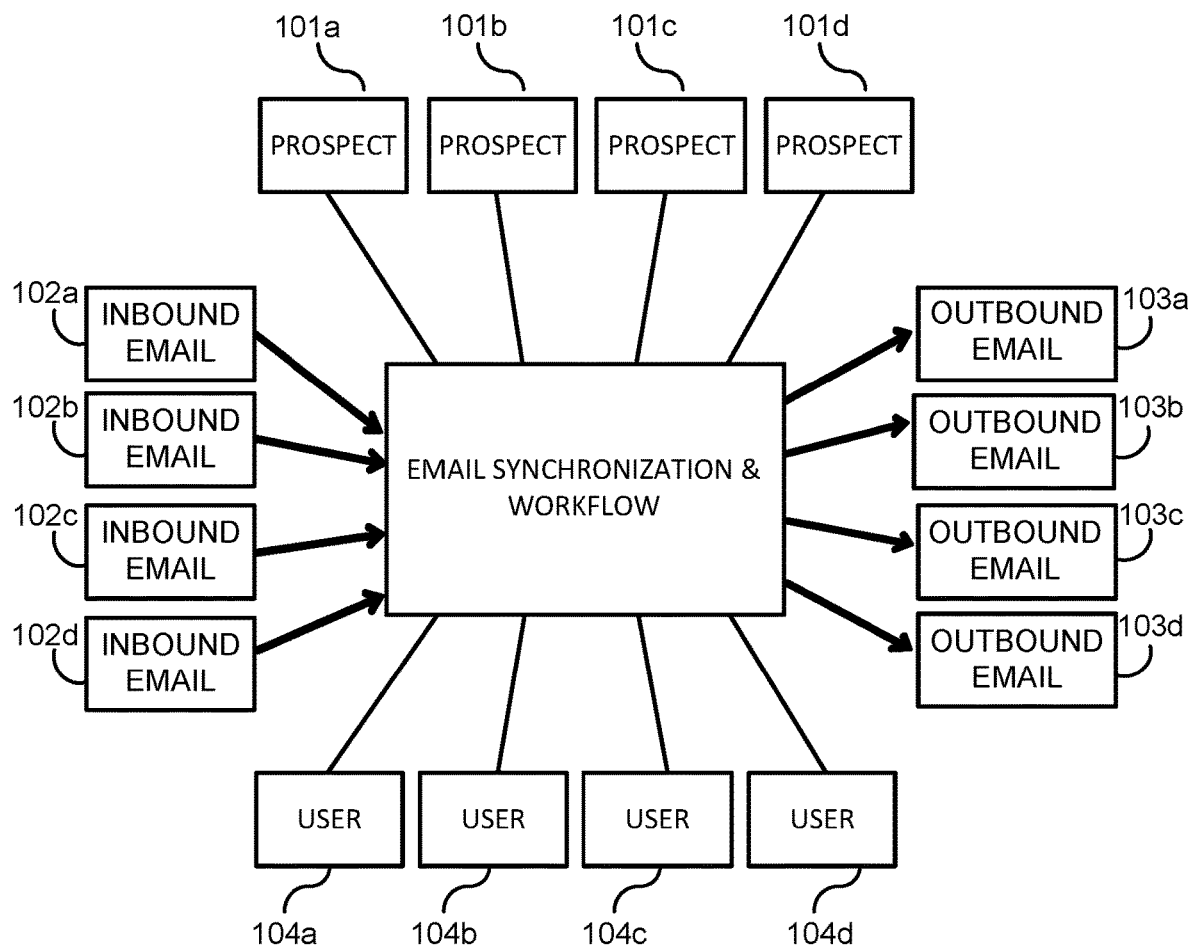
FIG. 1 is a schematic diagram showing a high-level overview of an email communication system in accordance with the present invention.

Referring to FIG. 1, an email synchronization and workflow system 100 is provided. A plurality of users 104a, 104b, 104c, and 104d are shown in FIG. 1. In accordance with the present invention, any number of users 104a, 104b, 104c, and 104d may be provided; and only four users are shown in the illustrated example for the sake of clarity. In the illustrated example, the users 104a, 104b, 104c, and 104d may be sales personnel who need to contact potential customers via email to sell a product or service. The email synchronization and workflow system 100 is operative to establish communications with prospects 101a, 101b, 101c, and 101d. In accordance with the present invention, any number of prospects 101a, 101b, 101c, and 101d may be provided; and only four prospects are shown in the illustrated example for the sake of clarity. As explained herein, the system 100 will automatically manage the delivery of outbound emails 103a, 103b, 103c, and 103d, while simultaneously managing inbound emails 102a, 102b, 102c, and 102d. The number of inbound emails 103a and outbound emails 102a that can be handled by a system in accordance with the present invention is not limited. For the sake of clarity, only four of each are shown in the illustrated example.

Figure 1A:
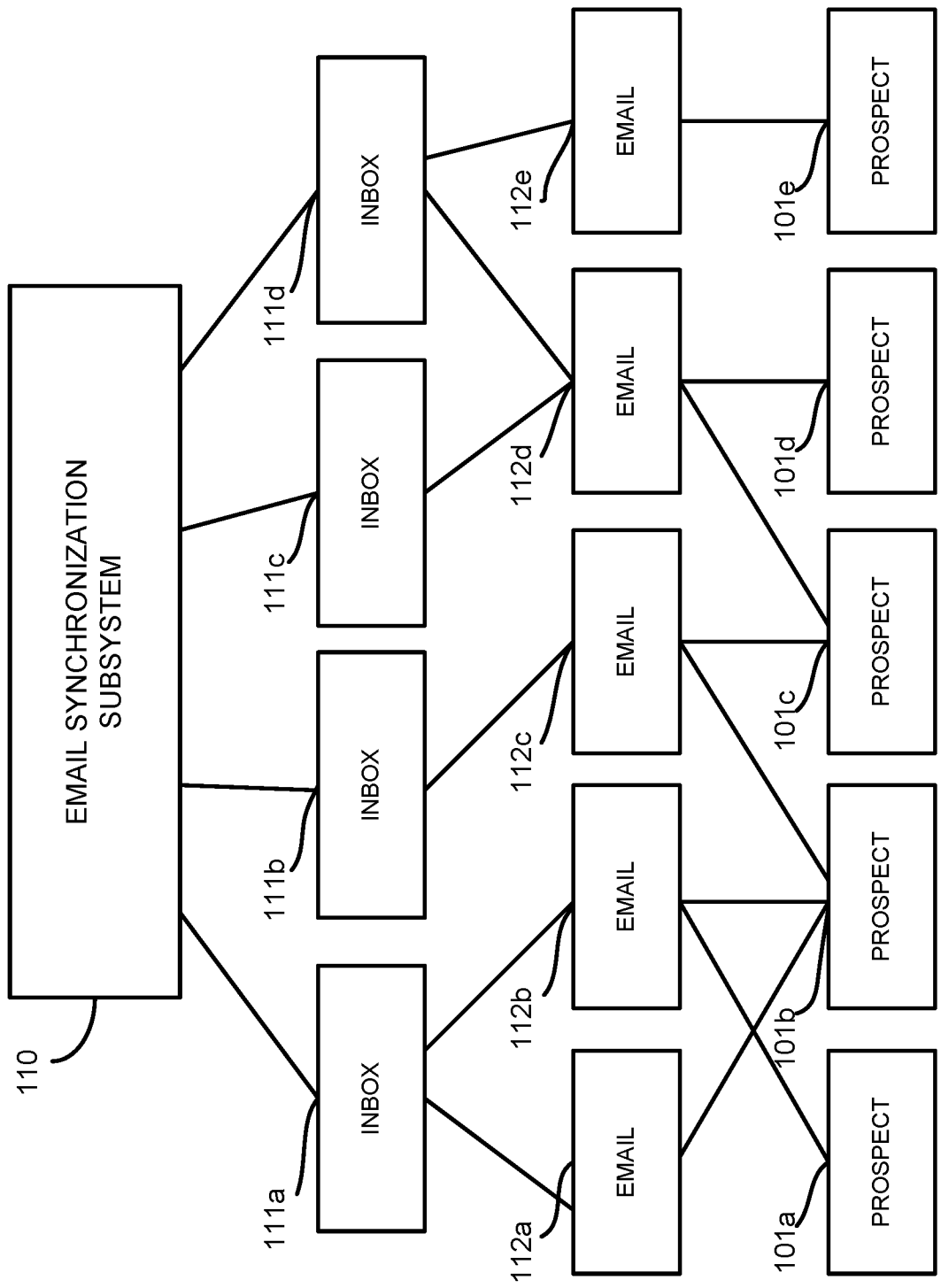
FIG. 1a is a schematic diagram showing an overview of the email synchronization subsystem.

Referring to FIG. 1a, an email synchronization subsystem 110 is provided. A plurality of email inboxes 111a, 111b, 111c, and 111d are shown in FIG. 1a. In the illustrated example, the inboxes 111a, 111b, 111c, and 111d may correspond to a user, for example 104a or user 104b shown in FIG. 1, on a many-to-one basis; (one user may have one or more configured inboxes). These inboxes 111a, 111b, 111c, and 111d may correspond to the sales personnel's corporate email account. The email synchronization and processing system 110 is operative to providing the necessary capability to process inbound messages 112a, 112b, 112c, and 112d from prospects 101a, 101b, 101c, and 101d.

In the illustrated example, communication with inboxes 111a, 111b, 111c, and 111d is established programmatically and happens on a continual basis to achieve real-time access to new emails. An independent connection is made to each separate inbox, for example inbox 111a, and new emails 112a, 112b, 112c, 112d, and 112e are received by the system 100 as they are delivered to a corresponding mailbox 111a. The communication can take place over a variety of protocols depending on the underlying email server on which the inbox 111a is located.

In practice, many customers have email servers provided by Google Apps. In the case of an email server provided by Google Apps, the communication protocol with the inbox 111a is configurable and can be done via the Internet Message Access Protocol (IMAP) on a polling basis or via the Google-specific GMail API on a push basis. Other customers have on-premise or cloud-hosted Microsoft Exchange email servers. In that case, inbox synchronization is done via Exchange Web Services (EWS).

A key distinction between the email synchronization subsystem 110 and typical applications of the IMAP, EWS, or the GMail API lies in the treatment of multiple inboxes 111a, 111b, 111c, and 111d simultaneously. In general, neither IMAP, EWS, nor the GMail API provides functionality to sync multiple inboxes, requiring each mailbox to be synchronized independently.

Figure 1B:
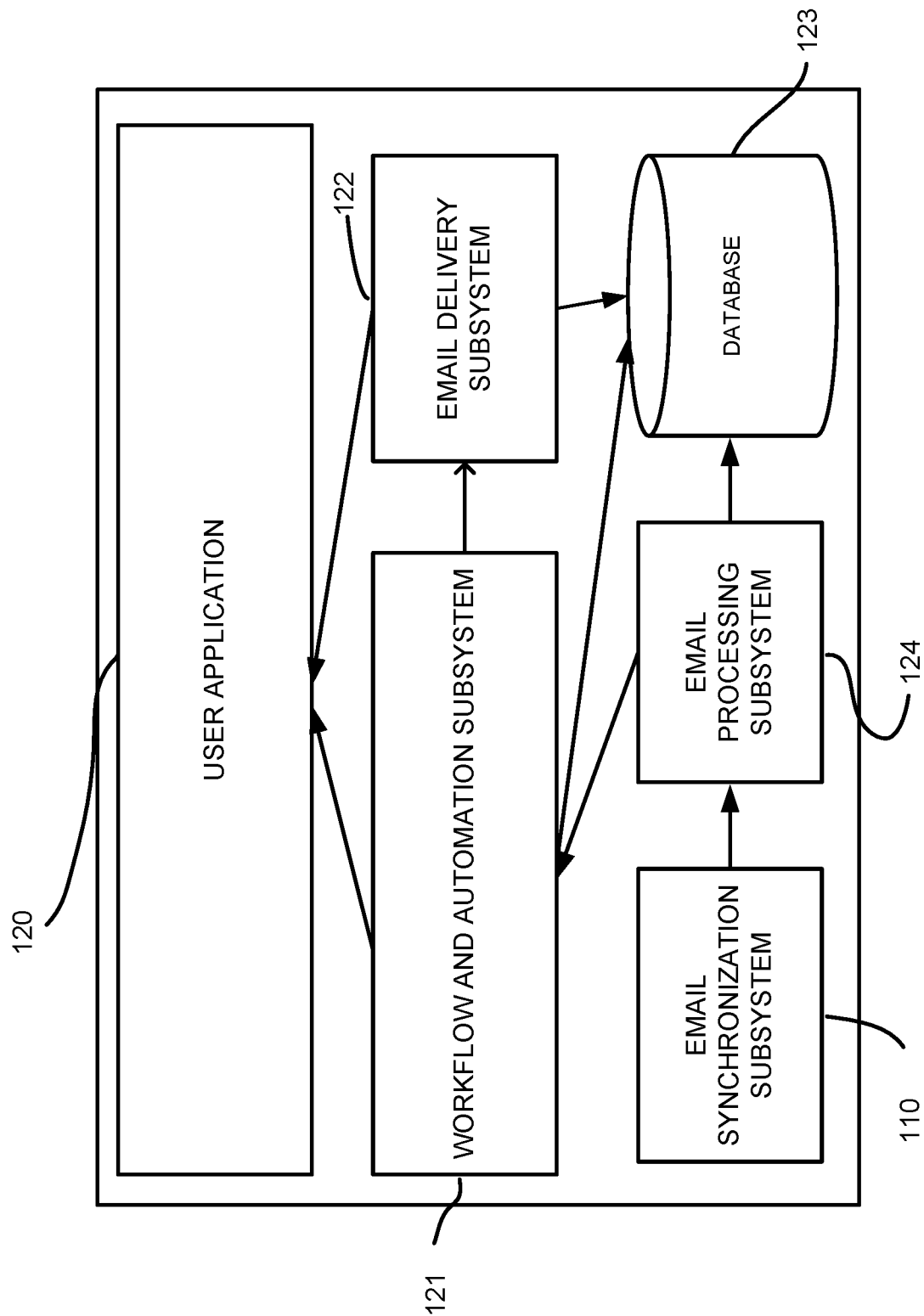
FIG. 1b is a schematic diagram showing an internal view of the various subsystems in accordance with the present invention.

In a typical application, a user 104a may provide a list of prospects 101a, 101b, 101c, 101d, and 101e to the synchronization and workflow system 100 in the form of a Comma Separated Value (CSV) spreadsheet. Referring to FIG. 1B, prospects 101a, 101b, 101c, 101d, and 101e may also be automatically generated based upon queries to a database 123 or based upon queries to a separate customer relationship management system, such as salesforce.com.

Figure 2:
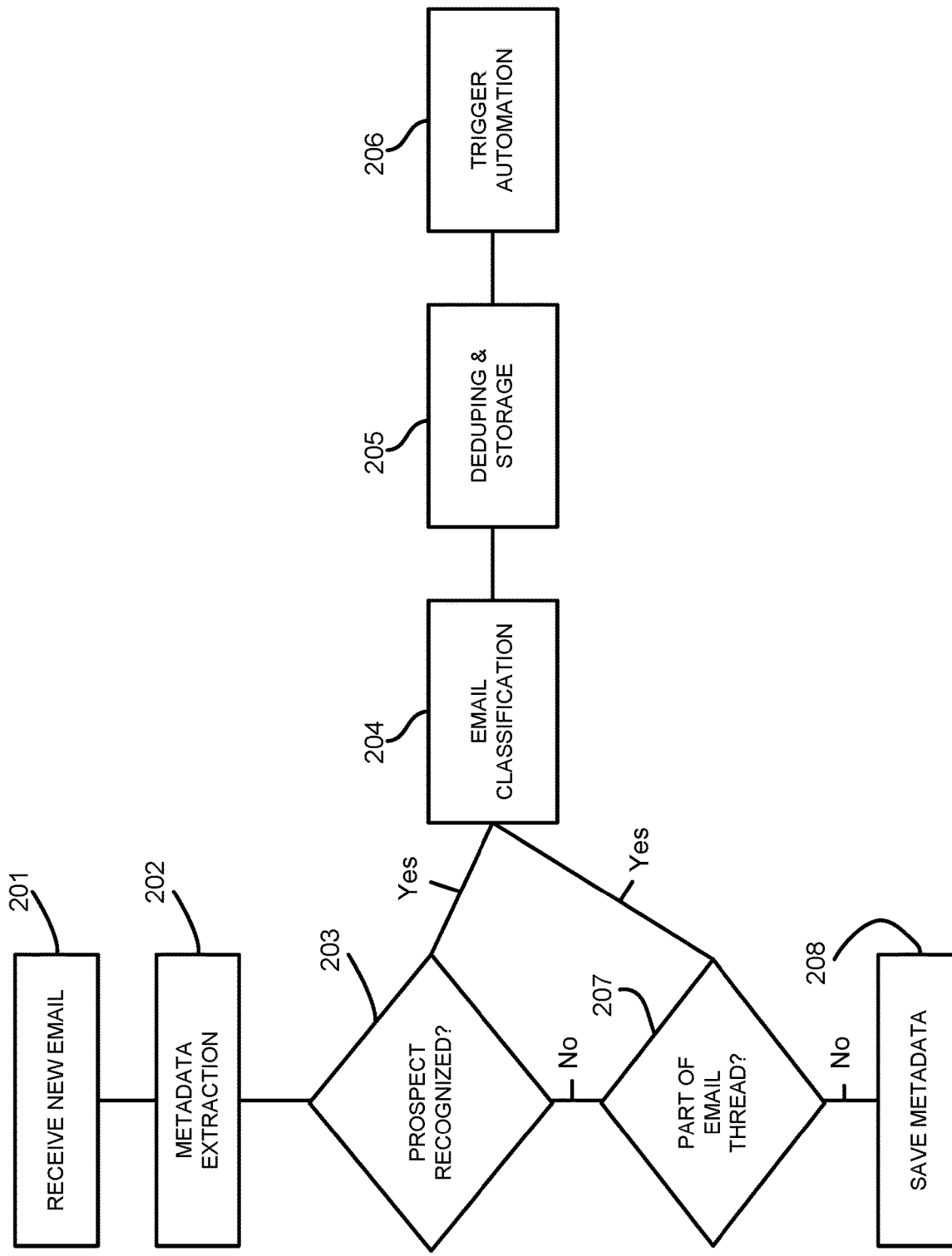
FIG. 2 is a flow chart illustrating how an embodiment of the system processes emails to determine next steps and actions to be taken in accordance with the present invention.

FIG. 2 illustrates a flow chart of one method of processing and storing emails received from the email synchronization subsystem 110. The method shown in FIG. 2 includes the steps involved in both determining which prospects 101a, 101b, 101c, 101d, and 101e (if any) are associated with a given email 112a as well as the storage of said emails in the database 123. More generally, the drawing shown in FIG. 2 relates to the email processing subsystem 124 shown in FIG. 1b.

Referring to FIG. 2, in step 201 the emails 112a, 112b, 112c, 112d and 112e received from the synchronization subsystem 110 are continually received and processed. The first procedural step 202 is to extract metadata about an email 112a from the RFC 2822 email headers associated with the email 112a. The TO, FROM, CC, and BCC headers are used to determine which users 104a, 104b, 104c and 104d and which prospects 101a, 101b, 101c and 101d are associated with the email 112a based on an email address match. In step 203, the system checks for the existence of a related prospect 101a, 101b, 101c or 101d. If a prospect 101a, 101b, 101c or 101d is not related to an email 112a, then step 207 checks to see if an email 112a is part of a larger email thread. In this method, the IN-REPLY-TO RFC 2822 email header is recursively checked to see if this email 112a is part of a larger email thread. If any previous email contains a reference to a prospect 101a, 101b, 101c or 101d, then this email 112a is considered to be indirectly related to that prospect 101a, 101b, 101c or 101d, respectively.

In this particular method, if none of the aforementioned steps 207 and 203 result in a related prospect 101a, 101b, 101c or 101d, this email is then stored in a database 123 and no further processing is done, as indicated in step 208.

In practice, email data is of the most sensitive kind with respect to customer privacy. It is thus desirable that emails 112a, 112b, 112c, 112d and 112e that are not directly related to the sales process (as determined by being related to a prospect 101a, 101b, 101c or 101d) are not stored in a way that preserves their contents. One method would be to simply not store the email 112a, 112b, 112c, 112d or 112e at all, but this loss of information can be undesirable for other parts of the system. Instead, to achieve this, in step 208, only the metadata about such emails 112a, 112b, 112c, 112d or 112e is stored. This metadata includes the RFC 2822 Message-ID as well as the MD5 hash of the subject and recipients. Although in this particular embodiment an MD5 hash is used, any other cryptographic hash function could be employed.

If a prospect 101a, 101b, 101c or 101d is related to an email 112a, 112b, 112c, 112d or 112e (as determined by steps 203 or 207), then the system attempts to derive additional information about the email 112a, 112b, 112c, 112d or 112e, respectively, in the form of a classification. One such embodiment of a classification system is to use a rule-based system wherein an order set of conditions maps directly to a classification. Such an embodiment is represented in FIG. 3.

As shown in FIG. 3, if an email 112a contains a subject that is prefixed with "Ooto", "Auto:", "Ooo", then the classification of the email will be Out of the Office (OOTO). If the email subject contains in any part of its contents "automatic reply", "auto response", "out of office", "out of the office", "away from my mail", "on leave", or "sick leave", then the email 112a will be classified as OOTO. If the first 80 characters of the body contains "out of office", "out of office", "away from mail", "on leave", "sick leave", or "maternity leave", then the email 112a will be classified as OOTO.

Also as shown in FIG. 3, if an email 112a has an RFC 2822 header named "Auto-submitted" with a value of "no" or any header named "x-autoreply", "x-autorespond", "x-mdautoresponse" exists, then the email will also be classified as Out of the Office. If the sender email address begins with "Mailer-daemon", "Mailerdaemon", or "postmaster", then the email 112a will be classified as Bounce. If the subject is prefix with "Undeliverable", "failed mail", "failed delivery", "mail delivery fail", "mail system error", "failure notice", "Nondeliverable", or "delivery status notification (failure)", then the email 112a will be classified as Bounce.

In FIG. 3, it is also shown that in this particular method, if the RFC 2822 IN-REPLY-TO or REFERENCES header of a particular email 112a contains a Message-ID stored in the database 123, then the email 112a is classified as Reply. When the email delivery subsystem 122 sends messages, it includes textual metadata in the body. If this metadata is present, then the email 112a is classified as Reply. If the email 112a contains an identical subject and recipient as a previous message delivery, then this email 112a is classified as Reply.

In the above embodiment as represented by FIG. 3, all rules are specific to the English language, but would be equally applicable in other languages. In a preferred method, the rules would be extended to include other language equivalents. For instance, "out of the office" would also include a rule to match "ausserhaus" in the German language.

Although reference is made herein to a heuristic rule-based system for email classification in this particular embodiment, other systems, such as statistical methods based on machine learning techniques, would also be applicable. For instance, a logistic regression model or neural network could be trained on a large number of sample email classifications in order to create a model that could be used to classify future emails.

Referring to FIG. 2, email messages 112a which are related to prospects 101a, 101b, 101c, 101d, or 101e in the system are stored in database 123, as represented by step 205. Email messages 112a are multi-threaded and may contain multiple recipients. As such, each inbound message 112a, 112b, 112c, 112d and 112e may exist in multiple inboxes 111a, 111b, 111c and 111d, and be related to multiple prospects 101a, 101b, 101c, 101d, and 101e. In this example, such messages 112a, 112b, 112c, 112d and 112e will all share the same RFC 2822 Message-ID. In this particular embodiment of the system, the storage 123 uses a simple deduplication method that ensures that each Message-ID only exists once in the database 123.

Prior to this invention, most third party systems acting on behalf of inboxes which attempt to receive replies to messages utilize the RFC 2822 REPLY-TO and SENDER headers. In practice, it has been found that this method provides very low accuracy. In the industry this can be as low as 30%. This is due to those headers being of particular interest to spam catching engines such as SpamAssassin. Moreover, these methods can have significant impacts on the sender's email reputation. This invention provides a significant advantage over such conventional methods and provides reply detection accuracies as high as if the user sent the email 112a manually; and the present invention has a marginal impact on email reputation.

Figure 6:
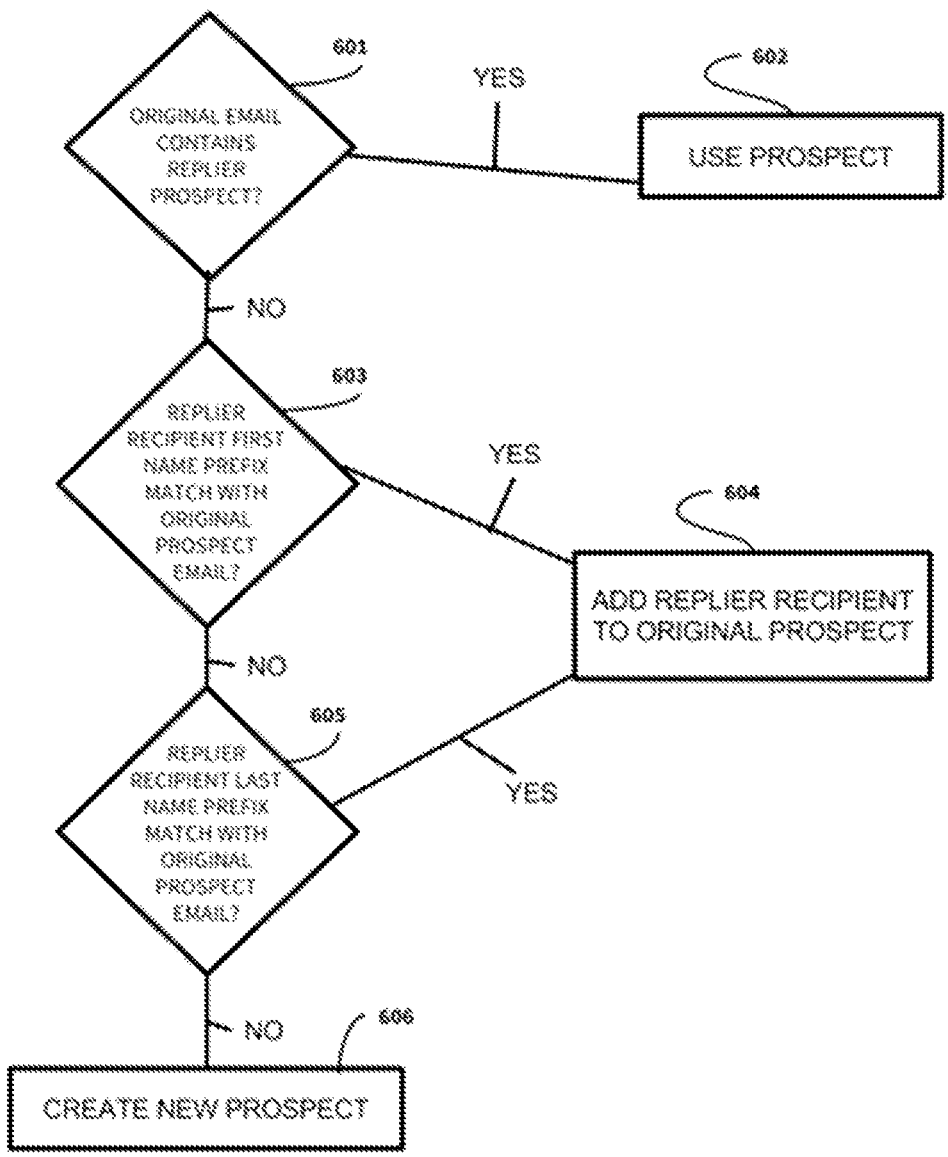
FIG. 6 is a flowchart illustrating how an embodiment of the system takes in data to create new identities or reconcile existing identities.

In practice, when sending email communications, it is not uncommon for a recipient to respond to an email 112a with a different email address than that which was specified as the "to" recipient. This may apply to an outbound email 112b sent to a prospect 101b as well, where the prospect 101b responds with a different email address than that which was specified as the "to" recipient in the email 112b sent to the prospect 101b. In this case, it is desirable for the system to correctly establish this new email address as corresponding to the original prospect 101b. FIG. 6 is a chart that represents an embodiment providing such functionality.

The chart represented by FIG. 6 shows steps necessary to determine indirect relationships between an inbound email 102a and a prospect 101c when there is not an exact email address match to existing prospects 101a, 101b, 101c, or 101d. As shown in step 601, this logic is not necessary if the prospect 101a replies with the original "to" email 102a and we have a direct match, in which case the system proceeds to step 602. However, if there is no match to the prospect 101c, the system proceeds to step 603. Steps 604 and 605 illustrate the core logic of this embodiment: if the inbound email 112a has a FROM address containing a character match with the first or last name of the original prospect 101c, then the system associates this new email address with the pre-existing prospect 101c. If neither first nor last name match with a preexisting prospect 101a, 101b, 101c, or 101d, the system proceeds to step 606, at which point the system creates an entirely new prospect 101e and associates the new prospect 101e with the inbound email 112a.

While the present description of an embodiment of the invention uses the example of a business that sells to potential customers over email, the usefulness of the present invention is not limited to an email sales environment. In most business environments, having conversations with existing customers, potential partners, and general communication is vital to the success of the business. The present invention may be useful in any environment in which communication by email is employed for any purpose.

Figure 4:
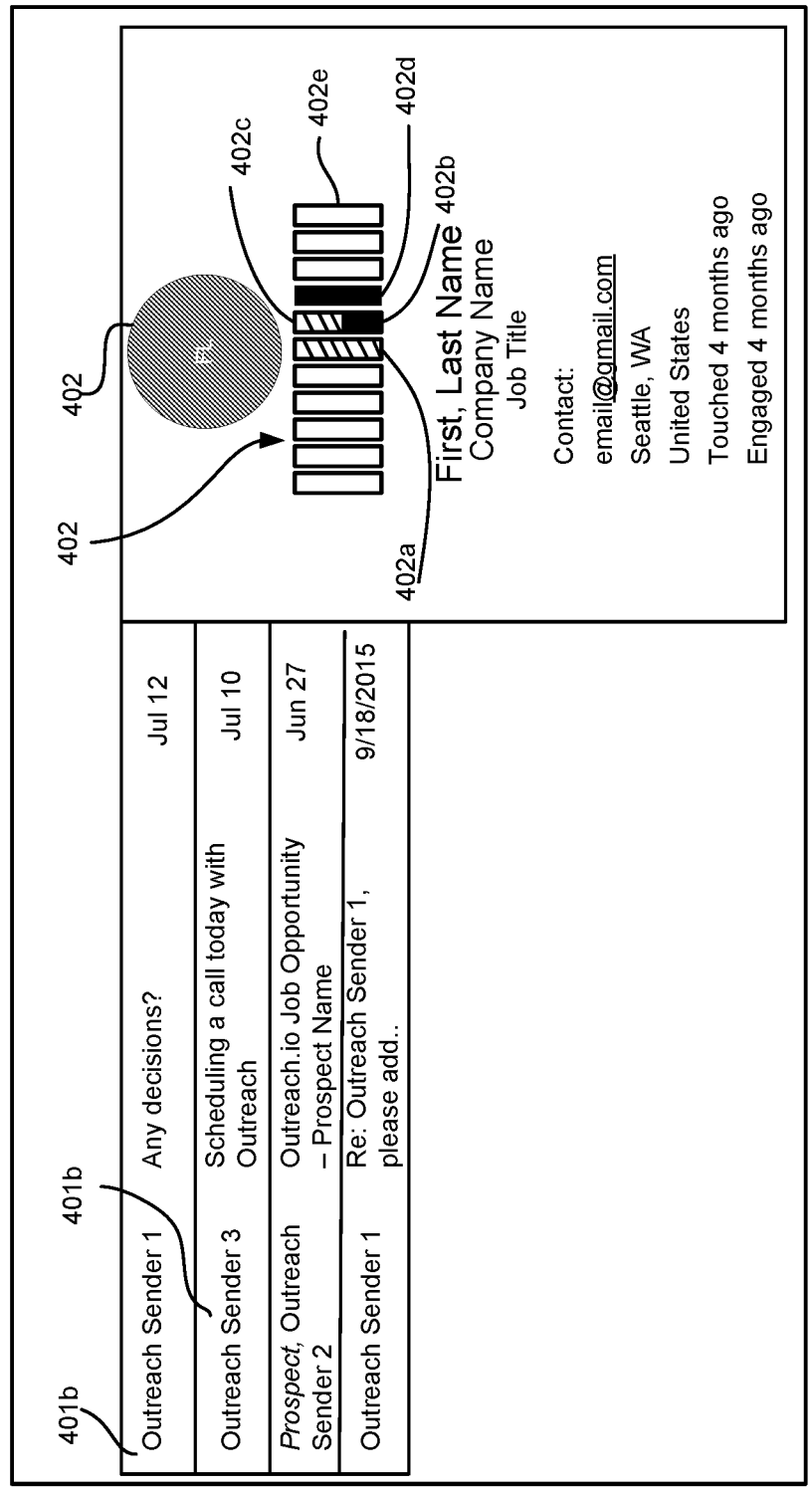
FIG. 4 illustrates a shared inbox view of a particular known prospect, pulling in email data from multiple mailboxes.

FIG. 4 illustrates a shared inbox view of a particular known prospect 101a, displaying email data from multiple mailboxes 111a, 111b, and 111c. It is common for multiple users 104a, 104b, 104c, and 104d to communicate to the same prospect 101c, and it is beneficial for users 104a, 104b, 104c, and 104d to be aware of this. For example, sender 401a can see that sender 401b has also been communicating with the prospect 101c, and for that reason, might choose not to engage in a particular email communication with that prospect 101c under certain circumstances. For example, sender 401a might not send a particular introductory offer to prospect 101c if the prospect 101c has already received the same offer from sender 401b. In practice, it has been found that more visibility allows a user 104a to make smarter decisions when it comes to engaging with a particular prospect 101c.

FIG. 4 includes a histogram 403 showing inbound and outbound communication history over a twelve month period with the prospect 101c, across all users' mailboxes 111a, 111b, 111c, and 111d. In the histogram 403, each empty bar represents a month, with the furthest right bar 402e being the current month. In the histogram 403, the bars 402b and 402d shown in black, in whole or in part, depict a graphical representation of outbound communication. In the histogram 403, the bars 402a and 402c shown as having dashed portions depict a graphical representation of inbound communication. If there was no communication in a given month, that fact will be graphically depicted in the histogram 403 as an empty bar 402e. This allows a user 104a at a glance to see the last time a prospect 101c was communicated with, and also the frequency of communication in the past. A responsive prospect would show a relatively balanced collection of black bars 402b and 402d with dashed bars 402a and 402c, where as an unresponsive prospect would show very little (if at all) dashed bars 402a and 402c.

Figure 5:
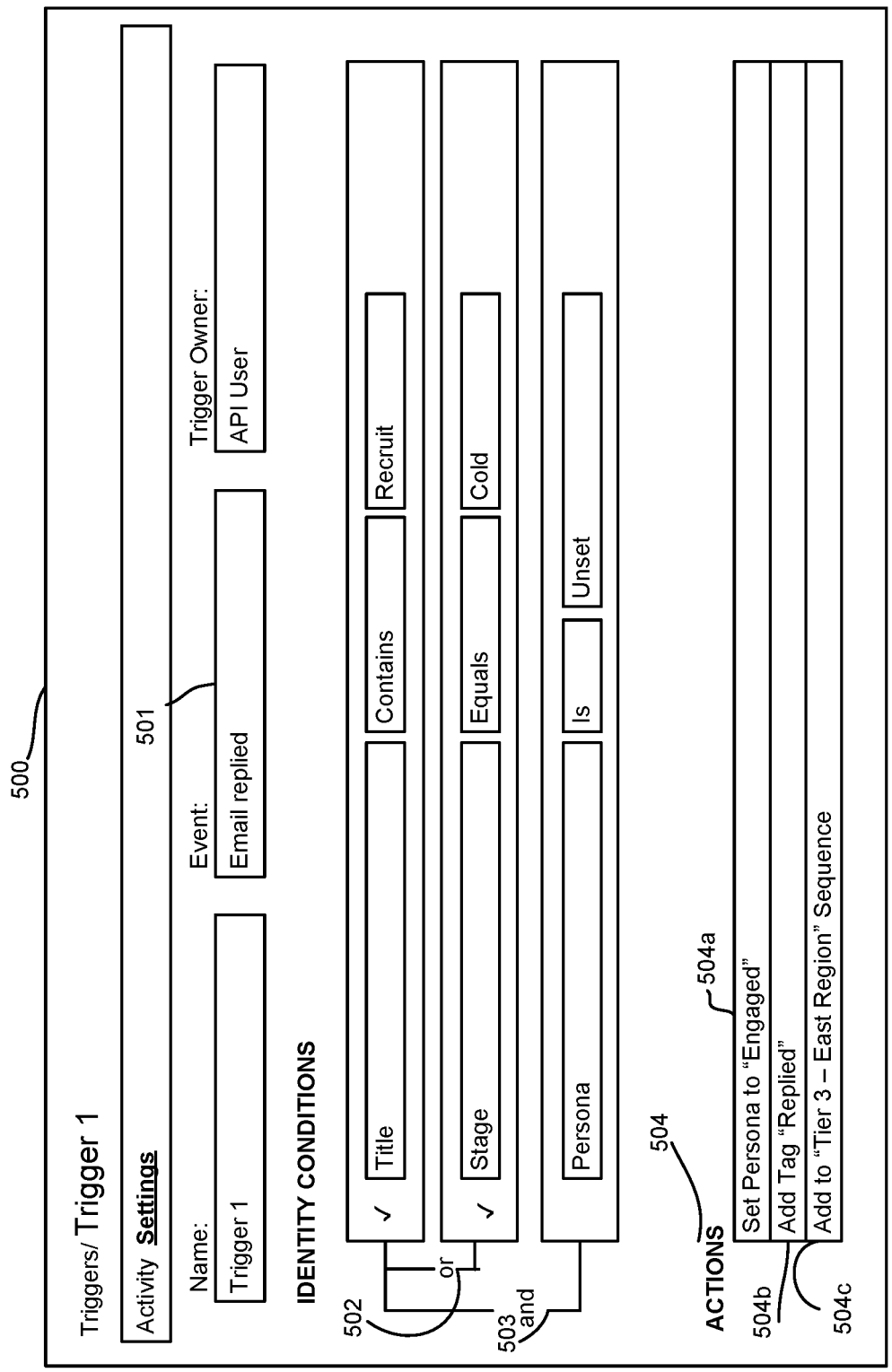
FIG. 5 illustrates a trigger system which executes actions based on email activity events.

Users often need the ability to execute specific actions based on events triggered from the Workflow System 100. Users can create Triggers to achieve this, which are a significant component to system 121. FIG. 5 is an example of a Trigger 500 created to update prospect information when an outbound email 103a is marked as replied 501 and specific prospect conditions 502 and 503 are met. In this example, these prospect conditions 502 and 503 must be met before the system will run the actions 504 shown in FIG. 5. Logical operators may be used to combine multiple conditions. In the illustrated example, the first two listed conditions 502 are: Prospect Title contains "Recruit" OR Prospect Stage equals "Cold". The first two conditions 502 are logically OR'ed together, meaning that if either condition occurs a logical "true" condition exists for those two. Then, those two conditions 502 are combined in the illustrated example with a third condition 503, which is Prospect Persona is unset. In this example, the third condition 503 is logically AND'ed with the first two conditions 502. Thus, the conditions 502, 503 for generating the action 504 are met in this example if either of the first two conditions 502 is true, and the third condition 503 is also true. The fields labeled "Title", "Stage", and "Persona" in FIG. 5 are examples of fields provided in the database 123 for data associated with a known prospect 101a, 101b, 101c and 101d.

Assuming these conditions are met as required by the specified logical operators, the following actions 504 shown in the example illustrated in FIG. 5 are executed in order: Set Prospect Persona to "Engaged" 504a. Add a tag of "Replied" to Prospect 504b. Then, Add the Prospect to the "Tier 3—East Region" Sequence 504c.

Users 104a, 104b, 104c, and 104d are able to set any combination of conditions and actions, allowing for a very powerful automation layer. The Workflow System 100 creates a variety of events Triggers can listen to, including: Email Delivered; Email Replied 501; Email Bounced; Email marked as Out of the Office; Prospect Created; and Prospect Updated.

Figure 7:
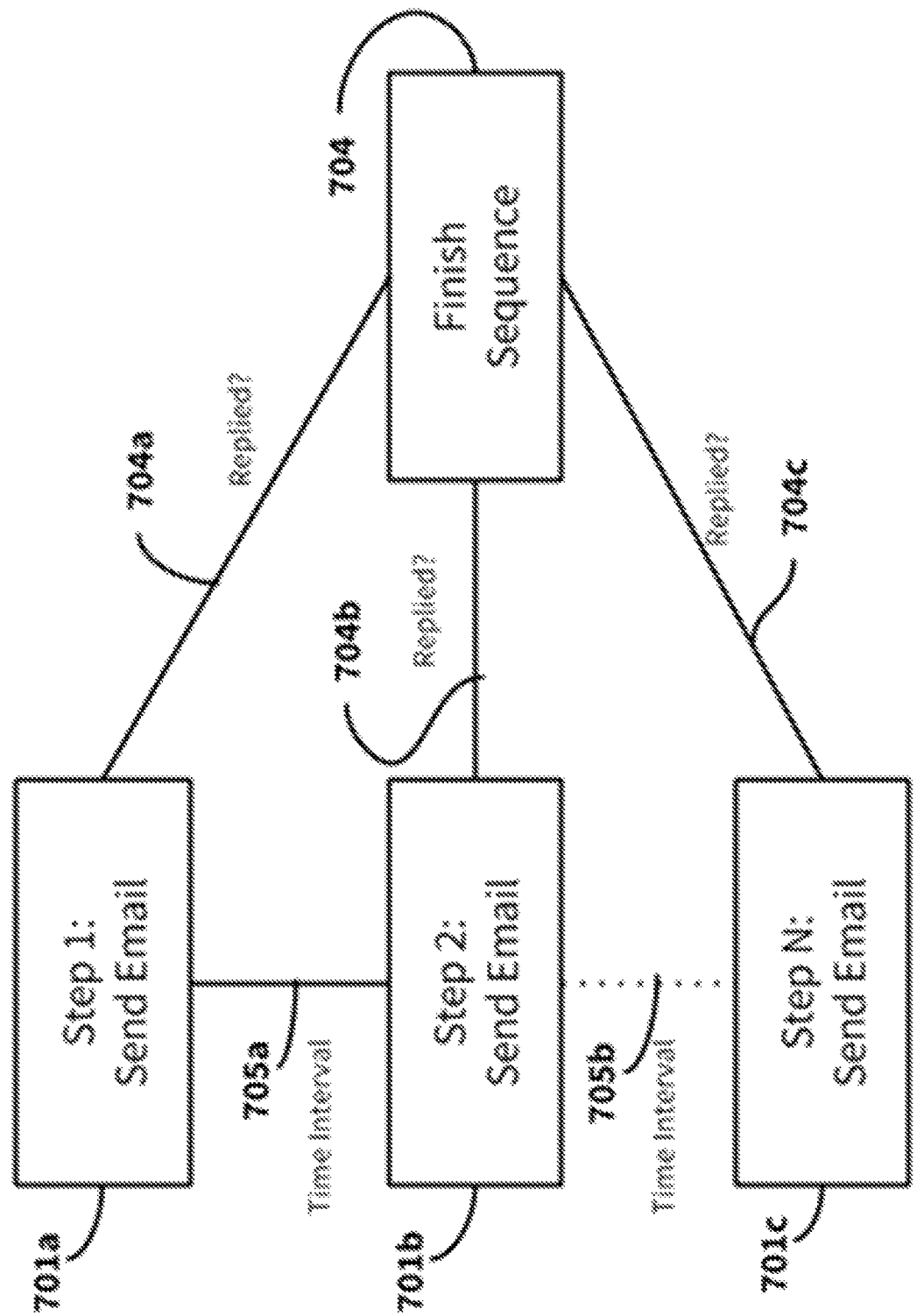
FIG. 7 is a flowchart illustrating a step-by-step email sequence to a given prospect, and how a single reply from the prospect finishes the sequence.

Sequences are an important feature of the workflow and automation system 121. FIG. 7 illustrates a sequence, which is a series of outbound emails 103a, 103b, 103c, and 103d designed to be sent to a prospect 101d, spaced out by predetermined time intervals 705a and 705b. Each sequence step can configure its own time interval 705a or 705b. When a prospect 101d is added to a sequence, the system starts at step 701a shown in FIG. 7. Step 701a delivers an email 103a to the prospect 101d and waits a set interval 705a for a reply. If no reply has been synced from system 110, the prospect 101d advances to step 701b and another email 103b is delivered to the prospect 101d. Again, the sequence waits another set interval 705b for a reply. If no reply is received, the prospect 101d advances to step 701c, and so on, until the prospect 101d has been through every step of the predetermined sequence.

If the prospect 101d replies in response to the email 103a sent in step 701a, the system 110 associates the reply with the prospect 101d in step 704a. If the prospect 101d replies in response to the email 103b sent in step 701b, the system 110 associates the reply with the prospect 101d in step 704b. If system 110 does sync a reply from the prospect 101d associated with any email 103a, 103b, etc., the prospect 101d is marked as finished in the sequence at step 704. When a prospect 101d is marked as finished, the prospect 101d will no longer receive any more emails from the sequence.

Expanding on sequence step intervals, users 104a, 104b, 104c, and 104d can also set their own delivery schedule blocks, as illustrated in FIG. 9. Sequence schedule blocks allow a user 104a, 104b, 104c, or 104d to deliver emails 103a, 103b, 103c, and 103d on specific days and times. This prevents emails 103a, 103b, 103c, and 103d from being delivered during unrealistic hours, such as 1:00 AM on a Saturday.

For example, users 104a, 104b, 104c, and 104d can specify a delivery window of 9:00 AM-6:00 PM PST on Mondays, using delivery schedule blocks 902a and 901a shown in FIG. 9, and choose not to deliver on Saturdays, excluding delivery schedule blocks 901c and 902b shown in FIG. 9. If a sequence step schedules an email 103b to be delivered in an invalid schedule block 901b, the email 103b will be scheduled to deliver at the next valid time 901a and 902a. For example, if a sequence step schedules an email 103b to be delivered on Saturday, but delivery schedule block 901c shown in FIG. 9 is excluded as a valid delivery window, the email delivery will be pushed up to the next valid time, which in this example, would be Monday at 9:00 AM, corresponding to delivery schedule block 902a shown in FIG. 9.

Figure 8:
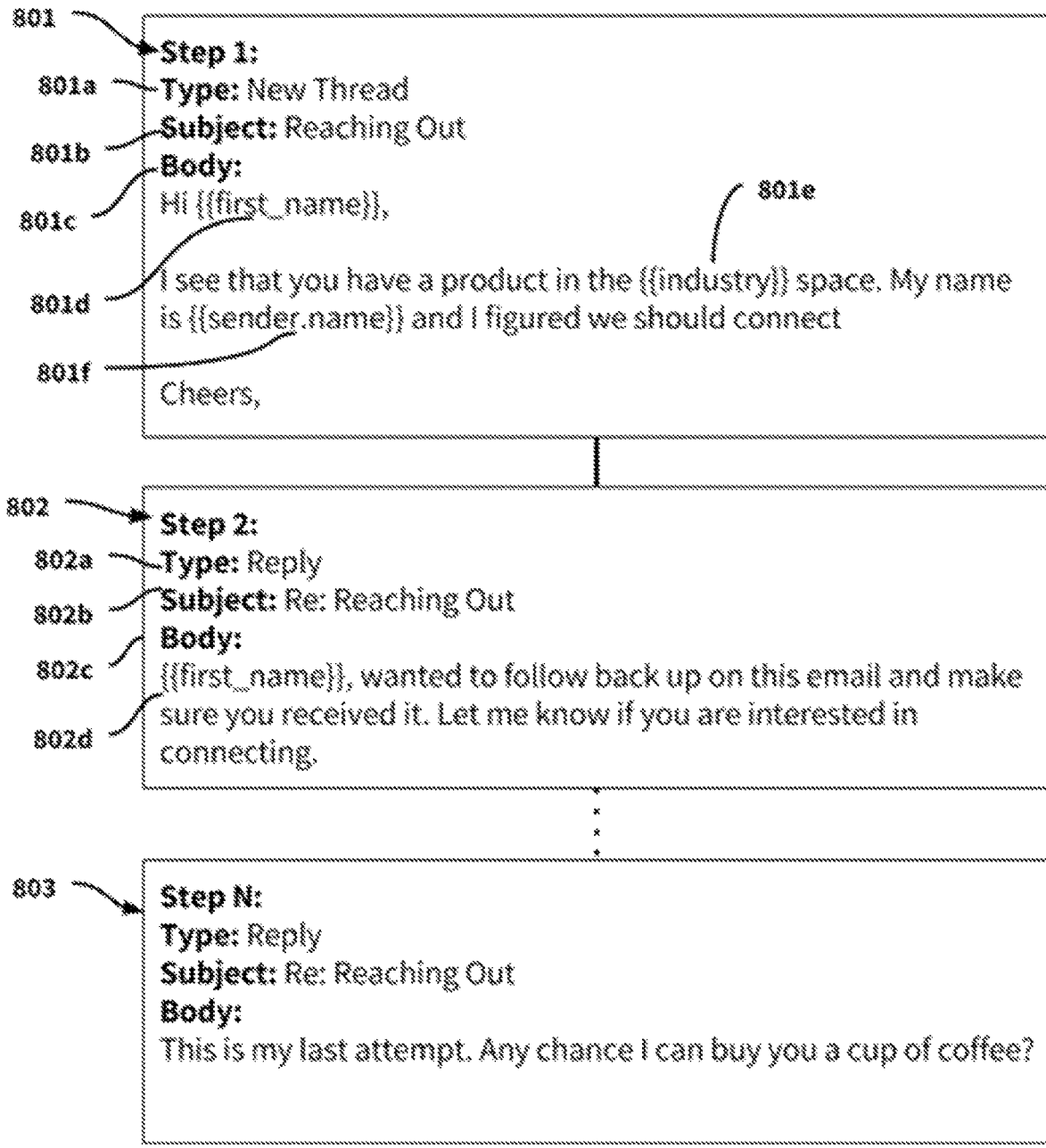
FIG. 8 is a flowchart illustrating a templating system preferably incorporated into email sequences.

Referring to FIG. 8, every sequence step maps to an email template 801 or 802, which contains a template type 801a and 802a, respectively, email subject 801b or 802b, respectively, and an email body 801c or 802c, respectively. A template type can either be a New Thread 801a or a Reply 802a. A New Thread template creates a brand new email thread, where as a Reply template replies to the previous email delivered. Because template 802 is marked as a Reply Template 802a, when an email 103b in accordance with template 802 is delivered, it will typically be a reply to an email 103a in accordance with template 801.

Both the template subject 801b and the template body 801c may contain template variables, shown in FIG. 8 with reference numerals 801d, 801e, and 801f. Template variables 801d, 801e, and 801f point to fields associated with a prospect 101b. For example, the "{{first_name} }" template variable 801d points to the "First_Name" field on the corresponding prospect 101b. If the first name of prospect 101b is "Joe", the variable "{{first_name} }" will be replaced with "Joe" when the template is compiled, shortly before delivery time via system 122. The fields labeled "first_name" and "industry" in FIG. 8 are examples of fields provided in the database 123 for data associated with a known prospect 101a, 101b, 101c and 101d, and the field labeled "sender.name" in FIG. 8 is an example of fields provided in the database 123 for data associated with a known user 104a, 104b, 104c, and 104d.

If a template variable does not exist on a particular prospect 101c, or there is a template compilation error, the associated email 103d will not be delivered. This is a safety setting in place to prevent delivering robotic looking emails, with uncompiled template variables. Users 104a, 104b, 104c, and 104d will need to manually fix these email drafts to continue a prospect 101a through a sequence.

The benefit of a sequence to the user 104a, 104b, 104c, and 104d is automated email follow-ups. Many times, it can take seven or more follow-up emails 103a, 103b, 103c, and 103d sent to a prospect 101a before the prospect 101a replies. Automating these follow-ups allows the user 104a, 104b, 104c, and 104d to communicate with more prospects 101a, 101b, 101c, and 101d and advantageously saves time.

Those skilled in the art, after having the benefit of this disclosure, will appreciate that modifications and changes may be made to the embodiments described herein, different design parameters and materials may be substituted, equivalent features may be used, changes may be made in the assembly, and additional elements and steps may be added, all without departing from the scope and spirit of the invention. This disclosure has set forth certain presently preferred embodiments and examples only, and no attempt has been made to describe every variation and embodiment that is encompassed within the scope of the present invention. The scope of the invention is therefore defined by the claims appended hereto, and is not limited to the specific examples set forth in the above description.

What is claimed is:

1. A non-transitory computer-readable medium comprising memory with instructions encoded thereon for automatically managing email communication between a user and a known prospect, the instructions, when executed by one or more processors, causing the one or more processors to perform operations, the instructions comprising instructions to:
    detect an email received at an email inbox of the user, the email received responsive to a given message of a sequence;
    extract metadata from a header of the email;
    determine that the metadata matches information in an entry of a database, the entry corresponding to the known prospect;
    determine a classification for the email by applying content of the email to a machine learning model and receiving as output from the machine learning model the classification; and
    transmit an instruction to generate a next message of the sequence in accordance with an updated activity, the updated activity selected from a plurality of candidate activities based on the classification.

2. The non-transitory computer-readable medium of claim 1, wherein the instructions to determine the classification comprise instructions to:
    identify at least a portion of the content of the email; and
    determine the classification based on the portion of content.

3. The non-transitory computer-readable medium of claim 2, wherein the instructions to identify at least the portion of content of the email comprise instructions to extract a prefix from a subject line of the email, and wherein the instructions to determine the classification based on the portion of content comprise instructions to determine the classification based on the prefix.

4. The non-transitory computer-readable medium of claim 3, wherein the classification is determined to be at least one of an out-of-office classification and a bounce classification.

5. The non-transitory computer-readable medium of claim 2, wherein the content comprises one or more keywords, and wherein the instructions to determine the classification based on the portion of content is based on at least one of the one or more keywords corresponding to the classification.

6. The non-transitory computer-readable medium of claim 1, the instructions further comprising instructions to:
    determine a sender email address of the email;
    determine whether the sender email address corresponds to a given classification; and
    responsive to determining that the sender email address corresponds to the given classification, determine the classification to be the given classification.

7. The non-transitory computer-readable medium of claim 6, wherein the classification is determined to be a bounce classification.

8. The non-transitory computer-readable medium of claim 1, wherein the classification is determined to be a reply classification.

9. The non-transitory computer-readable medium of claim 1, wherein the next message of the sequence is a message scheduled to be transmitted on a basis of a particular time.

10. The non-transitory computer-readable medium of claim 9, wherein the updated activity is selected based on a pre-programmed workflow indicating an activity that is to occur responsive to receiving a given email from the known prospect having the classification.

11. A method for automatically managing email communication between a user and a known prospect, the method comprising:
    detecting an email received at an email inbox of the user, the email received responsive to a given message of a sequence;
    extracting metadata from a header of the email;
    determining that the metadata matches information in an entry of a database, the entry corresponding to the known prospect;
    determining a classification for the email by applying content of the email to a machine learning model and receiving as output from the machine learning model the classification; and
    transmitting an instruction to generate a next message of the sequence in accordance with an updated activity, the updated activity selected from a plurality of candidate activities based on the classification.

12. The method of claim 11, wherein determining the classification comprises:
    identify at least a portion of the content of the email; and
    determine the classification based on the portion of content.

13. The method of claim 12, wherein identifying at least the portion of content of the email comprises extracting a prefix from a subject line of the email, and wherein determining the classification based on the portion of content comprises determining the classification based on the prefix.

14. The method of claim 13, wherein the classification is determined to be at least one of an out-of-office classification and a bounce classification.

15. The method of claim 12, wherein the content comprises one or more keywords, and wherein determining the classification based on the portion of content is based on at least one of the one or more keywords corresponding to the classification.

16. The method of claim 11, the method further comprising:
    determining a sender email address of the email;
    determining whether the sender email address corresponds to a given classification; and
    responsive to determining that the sender email address corresponds to the given classification, determining the classification to be the given classification.

17. The method of claim 16, wherein the classification is determined to be a bounce classification.

18. The method of claim 11, wherein the classification is determined to be a reply classification.

19. The method of claim 11, wherein the next message of the sequence is a message scheduled to be transmitted on a basis of a particular time.

20. A system comprising:
    memory with instructions encoded thereon for automatically managing email communication between a user and a known prospect; and one or more processors that, when executing the instructions, are caused to perform operations comprising:
    detecting an email received at an email inbox of the user, the email received responsive to a given message of a sequence;
    extracting metadata from a header of the email;
    determining that the metadata matches information in an entry of a database, the entry corresponding to the known prospect;
    determining a classification for the email by applying content of the email to a machine learning model and receiving as output from the machine learning model the classification; and
    transmitting an instruction to generate a next message of the sequence in accordance with an updated activity, the updated activity selected from a plurality of candidate activities based on the classification.

* * * * *